United States Patent
Jonas et al.

[11] Patent Number: 6,137,792
[45] Date of Patent: Oct. 24, 2000

[54] METHOD AND APPARATUS FOR ENABLING TRANSMISSION OF DATA PACKETS OVER A BYPASS CIRCUIT-SWITCHED PUBLIC TELEPHONE CONNECTION

[75] Inventors: Howard Jonas, Bronx, N.Y.; Eric Raab, East Brunswick, N.J.

[73] Assignee: International Discount Telecommunications Corp., Hackensack, N.J.

[21] Appl. No.: 08/664,983

[22] Filed: Jun. 14, 1996

[51] Int. Cl.[7] .................................................. H04L 12/66
[52] U.S. Cl. .......................... 370/354; 370/437; 709/238
[58] Field of Search .................................. 380/49, 33, 9, 380/50, 37, 2; 395/200.72, 182.02, 183.19, 309, 187.01; 379/93.31, 93.04, 114; 370/228, 245, 248, 392, 401, 282, 395, 352, 354–356, 400, 437, 389; 709/229

[56] References Cited

U.S. PATENT DOCUMENTS

| | | | |
|---|---|---|---|
| 4,802,220 | 1/1989 | Marker, Jr. ................................ | 380/33 |
| 4,817,147 | 3/1989 | Gorniak et al. ............................ | 380/49 |
| 4,922,534 | 5/1990 | Gorniak et al. ............................ | 380/49 |
| 5,058,163 | 10/1991 | Lubarsky et al. ........................... | 380/49 |
| 5,088,032 | 2/1992 | Bosack ................................ | 395/200.72 |
| 5,161,186 | 11/1992 | Dolev et al. ................................. | 380/2 |
| 5,193,086 | 3/1993 | Satomi et al. ............................ | 370/228 |
| 5,200,949 | 4/1993 | Kobayashi ............................... | 370/228 |
| 5,280,529 | 1/1994 | Nøst .......................................... | 380/49 |
| 5,442,708 | 8/1995 | Adams, Jr. et al. ....................... | 380/49 |
| 5,444,782 | 8/1995 | Adams, Jr. et al. ....................... | 380/49 |
| 5,729,594 | 3/1998 | Klingman ............................. | 379/93.12 |
| 5,732,078 | 3/1998 | Arango .................................... | 370/355 |
| 5,740,075 | 4/1998 | Bigham et al. ........................ | 709/229 |
| 5,751,706 | 5/1998 | Land et al. .............................. | 370/352 |
| 5,799,072 | 8/1998 | Vulcan et al. ........................... | 379/114 |
| 5,818,836 | 10/1998 | DuVal .................................... | 370/389 |

*Primary Examiner*—Hassan Kizou
*Assistant Examiner*—John Pezzlo
*Attorney, Agent, or Firm*—Oblon, Spivak, McClelland, Maier & Neustadt, P.C.

[57] ABSTRACT

A method and system for routing and transmitting data packets over a bypass circuit-switched telephone network from a source computer coupled to a packet-switched computer network via a source router and a destination computer coupled to said packet-switched computer network via a destination router. The source computer designates data packets to be transmitted over the bypass circuit-switched telephone network. These data packets are detected by the source router which establishes a connection to the destination router via the bypass circuit-switched telephone network. The source router then transmits the data packets to the destination router via the bypass circuit-switched telephone network. The destination router then transmits the data packets to the destination computer.

11 Claims, 3 Drawing Sheets

EXAMPLE INTERNET DATAGRAM HEADER

METHOD AND APPARATUS FOR ENABLING TRANSMISSION OF DATA PACKETS OVER A BYPASS CIRCUIT-SWITCHED PUBLIC TELEPHONE CONNECTION

FIELD OF THE INVENTION

This invention relates to a method and system for enabling data transmission over a bypass circuit-switched network between two computers connected to a public packet-switched network, such as the Internet, and more particularly, to a method and system for enabling secure transmissions with minimal delay.

BACKGROUND OF THE PRESENT INVENTION

Tens of thousands of computers are networked together via a public packet-switched network known as the Worldwide or Global Internet (the "Internet"). Any two computers connected to the Internet can transmit data to each other using communications protocols named TCP (Transmission Control Protocol) and IP (Internet Protocol). The wide acceptance of TCP/IP has made the Internet the largest and most popular computer network in history. Many Internet users access the Internet through a local telephone network connecting the user's computer to an Internet Commercial Service Provider, such as IDT Corp. of Hackensack, N.J. These Internet Commercial Service Providers provide a gateway connection to the Internet.

Communications across public packet-switched networks, such as the Internet, are broken up into a series of discrete data units called "IP datagrams" or "packets." Each computer (or "host") connected to the packet-switched network is assigned a unique IP address. Hosts are connected to the public packet-switched networks through routers which interconnect physical networks and perform routing and relaying functions. Every data packet transmitted between two hosts via TCP/IP contains a "header" that includes, among other fields, (i) the internet address of the source host (the host generating and sending the packet) and (ii) the internet address of the destination host (the host intended to receive the packet). Additionally, the header contains, among other items, codes for the class of service desired for the packet, protocol identifiers, and checksum fields to detect errors in transmission.

Public packet-switched networks are themselves comprised of networks of other packet-switched networks. The actual path traversed by each packet across these subnetworks is software configurable and determined by a multitude of routers that connect the various networks and subnetworks comprising the Internet. This path across the packet-switched network can change over time as the routers try to optimize the Internet data traffic. One such method for optimizing a data path is taught in U.S. Pat. No. 5,088,032 to Leonard Bosack entitled "Method and Apparatus for Routing Communications Among Computer Networks," which discloses a method of dynamically routing data packets across a computer network (such as the Xerox ETHERNET System or the IBM Token Ring System) having multiple alternative paths. The selection of the path the data will follow is based on multiple characteristics associated with each data path on the computer network, such as number of hops, delay time, bandwidth, reliability, cost, channel occupancy and security. Each gateway circuit on the computer network is designed to handle multiple "classes of service" for the data packets which may specify the relative importance of the various network characteristics.

Occasionally, two computers on a public packet-switched network wish to exchange secret data between themselves. While at least a portion of a typical user's data path from host computer to Internet Commercial Service Provider may be transmitted over public telephone lines, such transmissions are well protected from eaves-dropping or other spying by Federal Statute. Moreover, even if one chooses to violate the law and eavesdrop into the public telephone network, one must gain physical access to the telephone junction, telephone channel or termination point in order to tap into the data path and capture any data. In contrast, once a communication enters the Internet, maintaining secrecy becomes much more problematic. All messages transmitted over the Internet may be physically intercepted and "listened to" by any gateway system or host connected thereto. Thus, for example, many users are concerned about transmitting credit card numbers over the Internet, not because they fear someone has tapped their local or long distance telephone lines, but rather because other computers connected to the Internet itself may be listening to their transmissions as the data proceeds through the nodes or gateways of the Internet. Moreover, since each computers' Internet address is software-configurable, a rogue computer connected to the network can pretend to be at the Internet address of the true destination computer and intercept the data intended for it. This is sometimes referred to as "packet sniffing." Other modes of packet-sniffling can be employed that are completely transparent to the rest of the Internet, allowing the rogue computer to gather secret data without being detected.

A common solution to enable secret data transmission over the Internet, or other public packet-switched networks, is to encrypt the data. If only the sender and recipient know the encryption key of such a system it is difficult, but not impossible, for a packet-sniffer to decode the data that it captures.

Encrypted data nonetheless may be comprised. First, an encryption key can be stolen. Second, a message carelessly formed can reveal clues that make it easier to crack the encryption key. Third, a fast computer or network of computers may crack a seemingly safe key by brute force.

As a method of security, encrypting data also suffers from other disadvantages. For instance, a third party listening to encrypted messages may determine the destination hosts "visited" by an Internet user by examining the unencrypted internet source and destination fields in each packet, and, thus, gather information the user may consider private. Additionally, many common data encryption methods used over public packet-switched networks, such as the RSA encryption technology marketed by RSA Data Security of Redwood City, Calif., have been patented, thus leading to a search for alternative methods for transmitting secret data. Given these shortcomings, there exists a need for an alternative method, or a method which can be used in conjunction with existing encryption technology, to send and receive secret data between hosts connected to a public packet-switched network that is not subject to packet-sniffing.

One solution to the packet-sniffing problem is to transmit secret messages over a private, secure permanent packet-switched connection. This, however, requires a large start-up expense to establish either an independent secure network or a permanent private virtual circuit over a publicly available packet-switched network, such as GEIS™ or SprintNet™. Such costs are often not justified in light of the amount of data traffic across a given router. Thus, there exists a need for a method and system to enable computer users communicating across the Internet to transmit at least a portion of the communication across a network having a low initial connection cost, such as a circuit-switched public phone network or a circuit-switched interface to a secure packet-switched network.

An additional problem which occurs when communicating across public packet-switched networks, such as the Internet, is the presence of "delays" or pauses which occur when a packet must wait for transmission-related resources to become available at individual routers or nodes along its path. This can be caused by network congestion, for example when many "feeder lines" are attempting to funnel more data into a trunk line than the trunk line's rated capacity. This is particularly troublesome on public packet-switched networks, such as the Internet, where no authority limits the number of feeder lines transmitting through public trunks. A user transmitting or receiving critical data across a network may not be willing to tolerate these delays. Accordingly, there exists a need for a method and system to enable computer users connected to a public packet-switched network to transmit at least a portion of a communication between hosts on a circuit-switched network with minimal delay time. Although such a method may require additional costs and resources, as compared to transmitting solely over the Internet, these costs may be justified in light of the critical nature of the data being transmitted.

SUMMARY OF THE INVENTION

The object of the present invention is to provide a method and system for the automatic bypass for hosts communicating across a public packet-switched network for data traffic labeled as secure.

It is a further object of the present invention to provide a method and system for avoiding the delays inherent in a public packet-switched network by providing a bypass mechanism for secret and/or critical data traffic which requires minimal transmission delay.

The present invention is directed to a method and system for routing data packets between host computers connected to a public packet-switched network over an bypass circuit-switched public telephone connection. The host computers are each connected to the public packet-switched network via router computers. Each router computer is, additionally, able to connect with one or more other router computers via the circuit-switched telephone network. Packets which need to be sent over the alternative network may be so designated in the IP header or through other means. The sending router computer recognizes the request to transmit over the bypass network, establishes a connection over the circuit-switched telephone network, and then transmits the packet over the bypass circuit-switched telephone network.

BRIEF DESCRIPTION OF THE DRAWINGS

For a more complete understanding of the present invention, reference is made to the following Detailed Description taken in conjunction with the accompanying drawings in which.

DETAILED DESCRIPTION

Preferred embodiments of the present invention will now be described with continued reference to the drawings.

Figure 1:
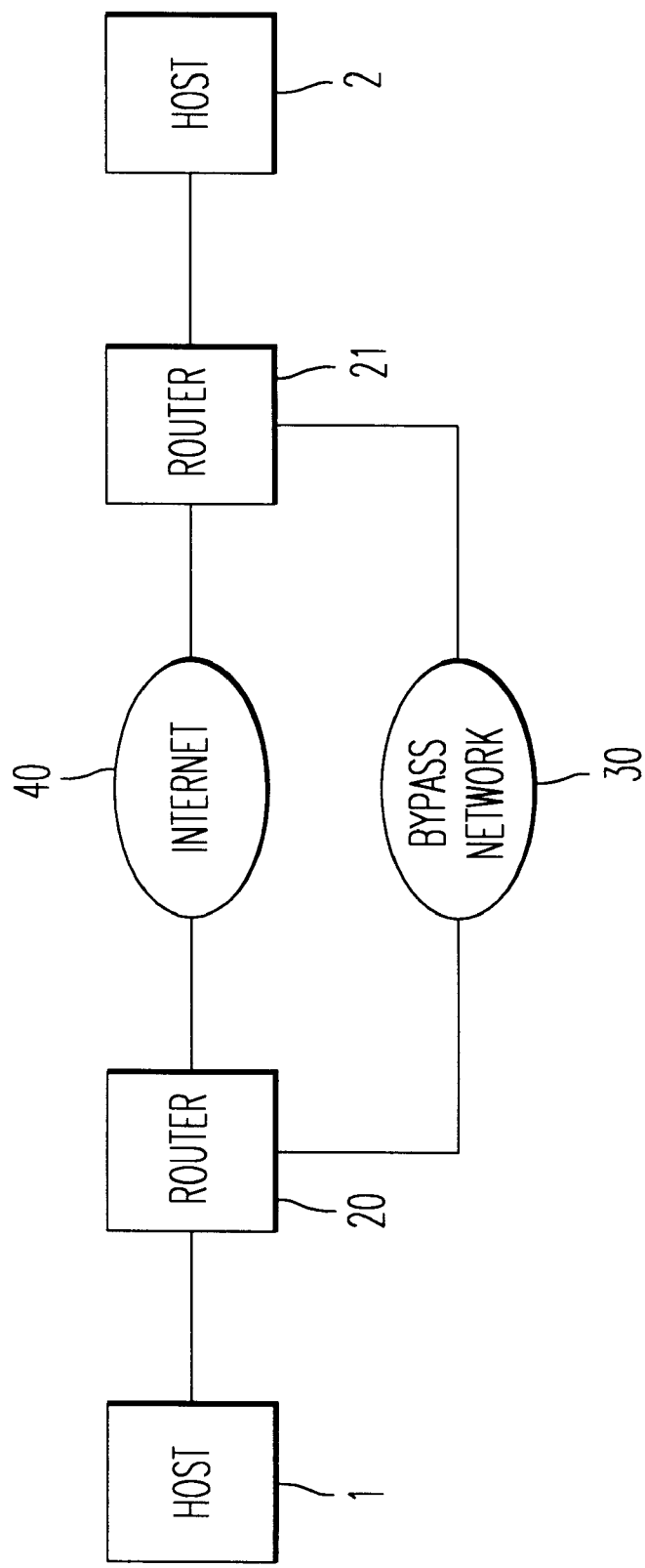
FIG. 1 is a block diagram of a system architecture in accordance with the present invention.

FIG. 1 shows a block diagram of a typical system architecture of a network constructed in accordance with the present invention. Host 1 may be permanently connected to router 20 via a phone line leased from the local telephone service 11, or, alternatively, connected to router 20 via a switched dial-up connection provided by the local telephone service 11, using a modem (not shown), ISDN adapter (not shown) or other device for transmitting data. Routers 20 and 21 are typically provided by an Internet Commercial Service Provider, however, alternate configurations are also available, such as one or more of the hosts being directly connected to the Internet as a router or gateway computer.

Normally, hosts 1 and 2 would transmit data to each other through routers 20 and 21 over the Internet 40. Occasionally, however, the transmitting host may wish to transmit secret data over the bypass circuit-switched telephone network 30. The host may also wish to transmit via the bypass network if the delay time over available paths on the Internet is unacceptable, such as for interactive or other time-critical applications.

The bypass network 30 connects the source and destination routers 20 and 21 respectively, and may be constructed in several ways. For example, the routers may transmit the packet over a regular dial-up analog phone line utilizing ordinary modems. Alternatively, packets may be transmitted over public ISDN telephone facilities. ISDN may be preferable because of the rapid call setup available and potentially superior data transfer rates. It will be understood by those skilled in the art that many variations of these public telephone networks are possible, the intent of the present invention being to utilize a circuit-switched connection over at least a portion of the data path between the source router 20 and the destination router 21. For example, a portion of an ISDN route may include a packet-switched segment. As used herein, the term "packet-switched" shall include both packet and message switched connections.

Host applications may also include a field in the packet indicating whether high bandwidth is required and an acceptable level of delay. For higher bandwidth applications, a switched-56K connection may be preferable.

Several methods for designating that a packet is to be sent over the bypass network 30 may be used. Preferably, packets to be transmitted over the bypass network 30 are so designated in the IP header 100. (FIG. 3) Alternatively, specialized applications for transmitting secret or time critical data may connect to a specific port of the router's 20 operating system. This port is preconfigured to reliably route the data over the bypass network. A third method for designating a packet for the bypass network is to transmit the message to the router with a special internet source address or destination address.

Figure 2:
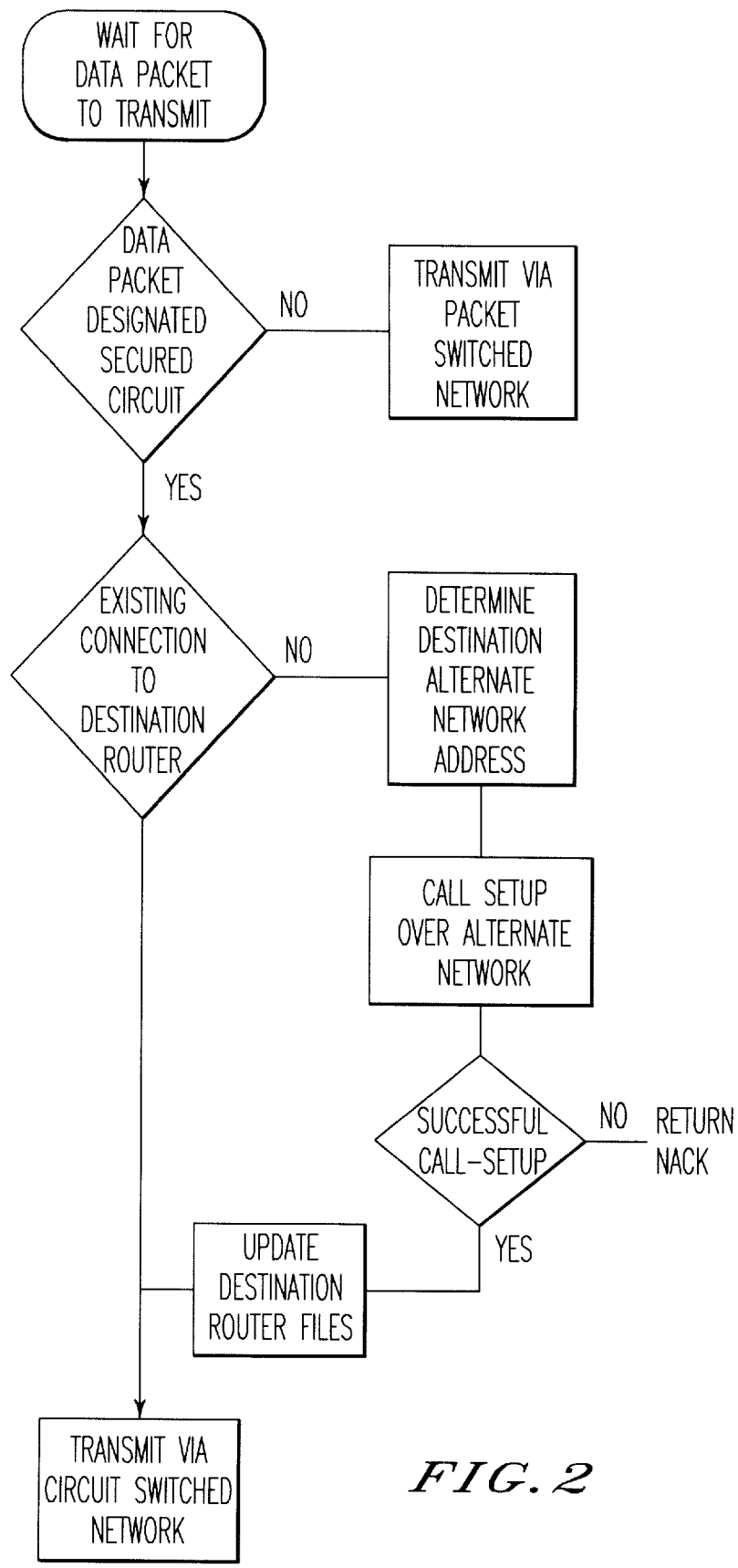
FIG. 2 is a flow chart showing an algorithm in accordance with the present invention for detecting a request to transmit over the bypass network and transmitting a packet over the bypass network.

As shown in FIG. 2, the source router 20 first determines whether an individual data packet is designated for an alternate network. If so designated, the source router 20 determines whether there is an existing alternate network connection to the destination router 21 by examining a memory file of existing alternate network routers. Where multiple "classes of service" are allowed, the source router 20 must further determine whether the existing link meets the desired class of service. If there is no suitable existing connection, the source router 20 will determine the address of the destination router 21 on the circuit-switched network. Again, where multiple classes of service are allowed, the source router 20 must also determine whether the destination router 21 is capable of receiving the appropriate connection. The source router 20 then establishes a connection (i.e.

"dials" the call) over the circuit-switched network 30 to the destination router 21 and updates the memory file of existing alternate network connections. It will be obvious to those skilled in the art that multiple alternate designation networks or connections may be used each having different characteristics, such as delay time (circuit-switched or packet-switched subpaths) and bandwidth.

The destination router 21 will receive notification of an incoming call over the circuit-switched network and execute a process to accept the connection and integrate data packets from this connection into the packets received from the packet-switched connection. The destination router 21 also adds this connection to its memory file of existing alternate network connections in case it wishes to send secure or critical data packets to the source router 20. If the data protocol is "connection-oriented," such as the TCP protocol, the data packets must be reordered into a sequential order by the receiver. Once a connection over the telephone network is established, the destination router may send secret or critical packets generated by the destination computer over the same telephone connection via the process described above.

The destination router's 21 telephone network phone address may be encoded in router configuration files stored on the destination routers. Thus, when source router 20 wishes to transmit via the bypass public telephone network 30 it queries or examines the router configuration file stored on the destination router 21 for the destination router 21 telephone network phone address. The configuration files are preferably password-protected to avoid modification by a malevolent intruder, and are most preferably encrypted to prevent forgery of the phone number. One such acceptable encryption method to avoid tampering or forgery of publicly accessible data messages is taught in U.S. Pat. No. 4,218,582 to Hellman et al. entitled "Public Key Cryptographic Apparatus and Method." The source router 20 may query the destination router 21 by either directly examining the destination router's 21 configuration file or by requesting the destination router 21 to return a specialized data packet containing its telephone network address. Preferably the destination router's 21 configuration file also provides other telephone network information describing the type of connections the destination 21 is capable of accepting over the telephone network 30.

Once a connection between source and destination routers 20 and 21 has been established, the source router 20 will monitor the data packet traffic between the source and destination routers. The source router 20 will disconnect the circuit-switched connection if there is no activity in either direction after a preset time, preferably 60 seconds, although this time-out period may also be either end-user or router-administrator configurable.

Certain applications, may wish to dynamically take advantage of both the inherent cost benefit of using the packet-switched Internet and the minimal delay time of circuit-switched telephone networks. This is accomplished by having the system monitor the transmission delay between the source router 20 and destination router 21. If this delay rises above a threshold value the source router 20 will establish a connection over the bypass network 30. The source router 20 may detect the transmission delay to the destination router 21 using a variety of measures known to those skilled in the art, including topological delay time for the transmission, cost, or the number of gateways through which the network path traverses ("hops"). While transmitting over the bypass network 30, the source router 20 may continue to monitor the delay time between the source router 20 and destination router 21 by sending occasional "ping" messages to the destination router 21 and monitoring delay times of any response packets.

Figure 3:
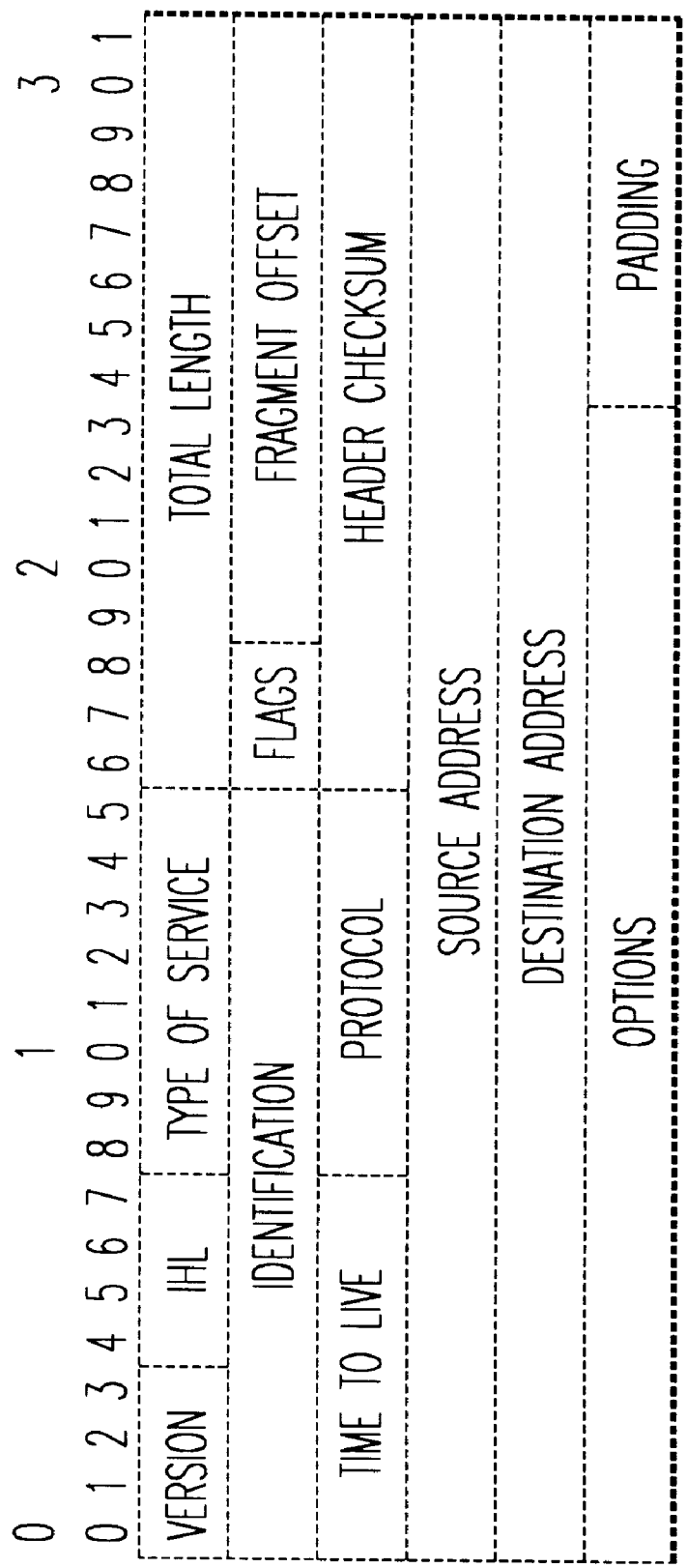
FIG. 3 is a block diagram of an IP packet header designated for transmission over the bypass network in accordance with an embodiment of the present invention.

IP headers are specified by DARPA Request for Comment (RFC) 791, available on the Internet in a number of locations including www.nic.ddn.mil. FIG. 3 is a block diagram of the contents of an internet header of a data packet in accordance with the present invention. Data packets may be designated as secret or critical in any of a number of fields, preferably in the "type of service" field.

It is understood that various other modifications will be apparent to, and can be readily made by, those skilled in the art without departing from the scope and spirit of the present invention. For example, it will be apparent to those of skill in the art that the packet-switched network may support any of a number of protocols, such as TCP/IP, DECnet, or the ISO/OSI protocol. Moreover, although described herein as separate entities, both the source and destination routers 20 and 21 may be physically the same computer as the source host 1 and destination host 2, respectively. Accordingly, it is not intended that the scope of the claims be limited to the description or illustrations set forth herein, but rather that the claims be construed as encompassing all features of patentable novelty that reside in the present invention, including all features that would be treated as equivalents by those skilled in the art.

What is claimed is:

1. A method for the transmission of data packets from a source computer coupled to a packet-switched computer network via a first router, to a destination computer coupled to said packet-switched computer network via a second router, said first router and said second router being permanently coupled to the packet-switched computer network via a packet-switched connection and being selectively coupled to a bypass network via a circuit-switched connection, said second router having an address on said bypass network, said method comprising the steps of:

(a) designating said data packets as requiring transmission via said bypass network;

(b) transmitting said designated data packets from said source computer to said first router;

(c) detecting said bypass network data packet designation at said first router;

(d) determining said bypass network address of said second router;

(e) establishing the circuit-switched connection across the bypass network between said first router and said second router by causing said first router to dial a telephone number associated with said second router while maintaining the packet-switched connection;

(f) transmitting said designated data packets from said first router to said second router via said bypass network while maintaining the packet-switched connection; and (g) transmitting said designated data packets from said second router to said destination computer.

2. The method for the transmission of data packets of claim 1, wherein said source computer is coupled to said first router via a local area network.

3. The method for the transmission of data packets of claim 1, wherein said second router bypass network address is stored in a configuration file on said second router.

4. The method for the transmission of data packets of claim 3, wherein said first router determines said second router bypass network address by querying said second router.

5. The method for the transmission of data packets of claim 1, wherein said data packets comprise an IP header portion, said data packets being designated for transmission via said bypass network by modifying a field in said IP header.

6. The method for the transmission of data packets of claim 1, wherein said first router comprises a plurality of I/O ports including at least one port assigned for accepting packets to be transmitted over said bypass network, said data packets being designated for transmission via said bypass network by coupling said source computer to said at least one assigned port of said first router.

7. The method for the transmission of data packets of claim 1, wherein said first router comprises said source computer, said transmission from said source computer to said router comprising an interprocess communication within said router.

8. The method for the transmission of data packets of claim 1, further comprising the steps of monitoring the data packet traffic across the bypass network connection, and disconnecting said bypass network connection when no data packets have been transmitted between said source router and said destination router for a threshold amount of time.

9. The method for the transmission of data packets of claim 1, wherein a plurality of data packets are transmitted from said destination router, at least a portion of said data packets transmitted from said destination router being designated for transmission via said bypass network, said method further comprising the steps of:

detecting when data packets being transmitted from said destination router are designated for transmission via said bypass network; and transmitting said bypass network designated packets via said bypass network connection established in step (e).

10. A method for transmitting data packets with minimal network delay time from a source computer coupled to a packet-switched computer network via a first router, to a destination computer coupled to said packet-switched computer network via a second router, said first router and said second router being permanently coupled to the packet-switched computer network via a packet-switched connection and being selectively coupled to a circuit-switched telephone network, said second router having a telephone number corresponding to a connection to said circuit-switched telephone network, said method comprising the steps of:

designating said data packets as requiring transmission with minimal delay;

transmitting said minimal delay data packets from said source computer to said first router;

detecting said minimal delay data packet designation at said first router;

determining said telephone number of said second router;

establishing the circuit-switched connection across the bypass network between said first router and said second router by causing said first router to dial said telephone number associated with said second router while maintaining the packet-switched connection;

transmitting said minimal delay data packets from said first router to said second router via said telephone network while maintaining the packet-switched connection; and transmitting said minimal delay data packets from said second router to said destination computer.

11. The method for transmitting data packets with minimal network delay time of claim 10 further comprising the step of determining when average packet delay time across the packet-switched computer network is above a threshold level.

* * * * *

UNITED STATES PATENT AND TRADEMARK OFFICE
CERTIFICATE OF CORRECTION

PATENT NO. : 6,137,792
DATED : Oct. 24, 2000
INVENTOR(S): JONAS, et al.

It is certified that an error appears in the above-identified patent and that said Letters Patent is hereby corrected as shown below:

On the title page, Item [73], the Assignee information is incorrect.
Item [73] should read as follows:

--- [73]  Assignee:  Net2Phone, Inc., Hackensack, N.J. ---

Signed and Sealed this

Twenty-ninth Day of May, 2001

*Attest:*

NICHOLAS P. GODICI

*Attesting Officer*     *Acting Director of the United States Patent and Trademark Office*